H. W. BLAISDELL & G. P. BALDWIN.
HOSE REEL.
APPLICATION FILED JULY 16, 1907.
923,320. Patented June 1, 1909.
6 SHEETS—SHEET 1.
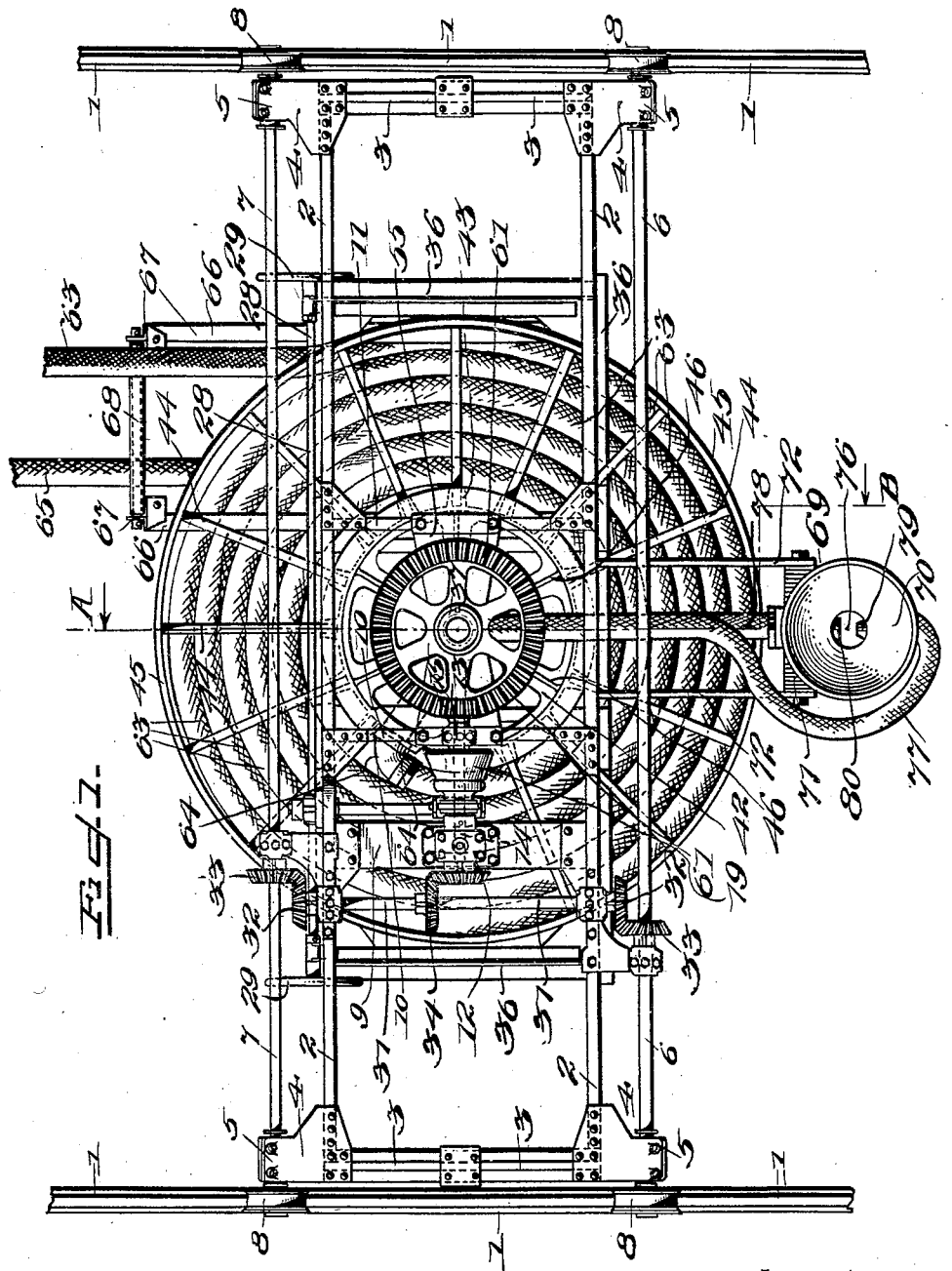
Attest:
R. W. Ashley
George V. Gilmore
Inventors
Hiram W. Blaisdell
and
George P. Baldwin
by Maztick & Jones their Attys

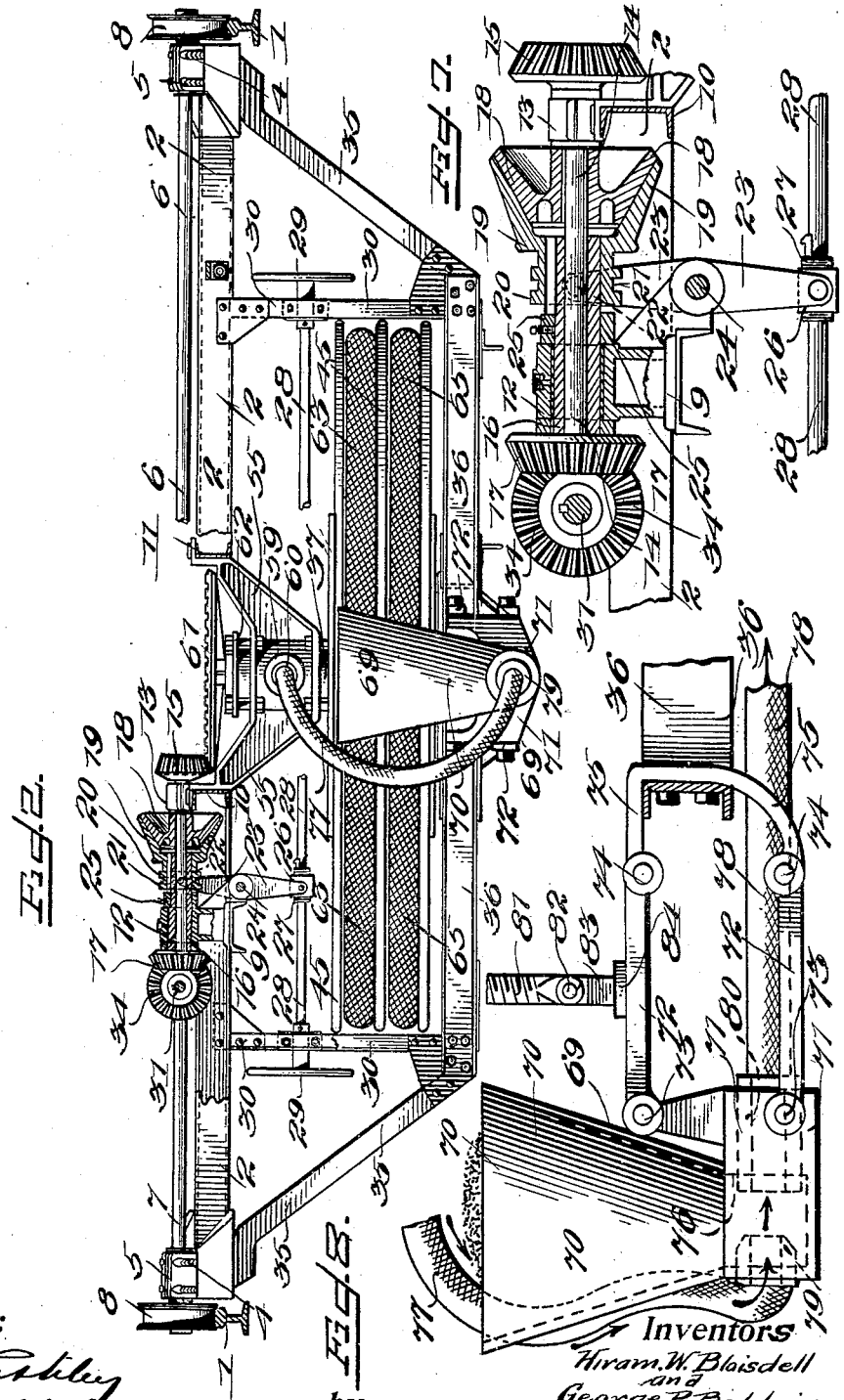

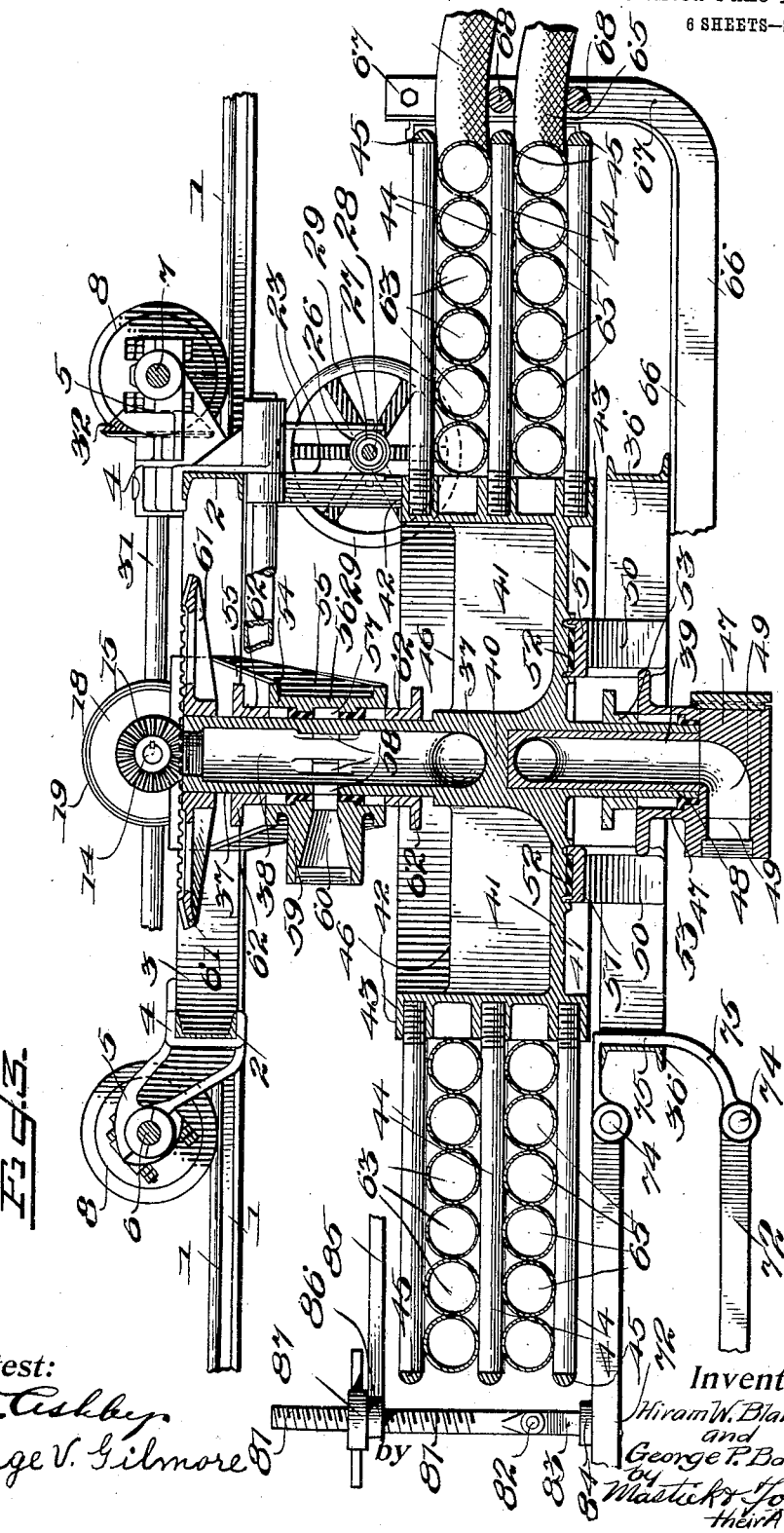

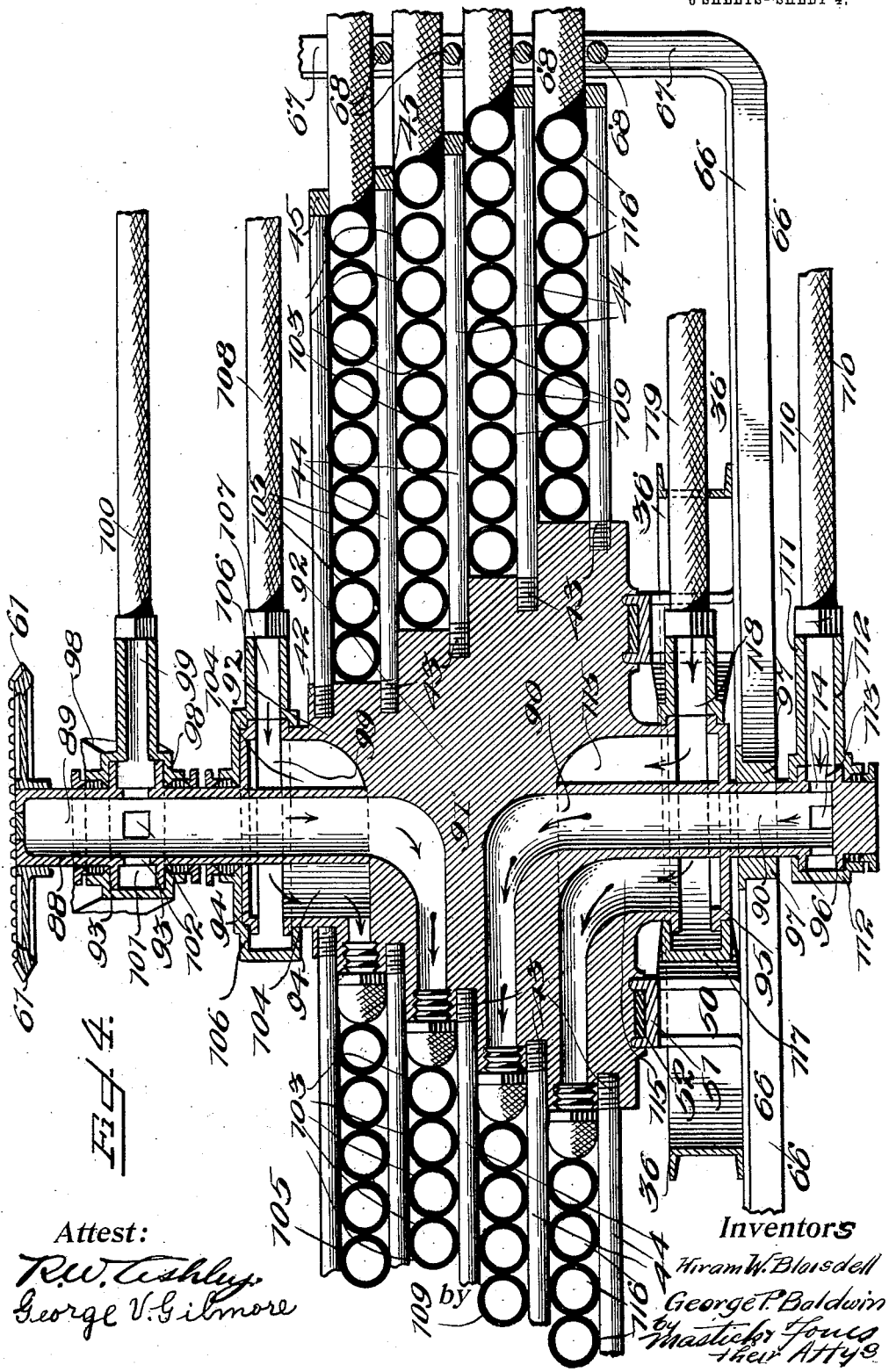

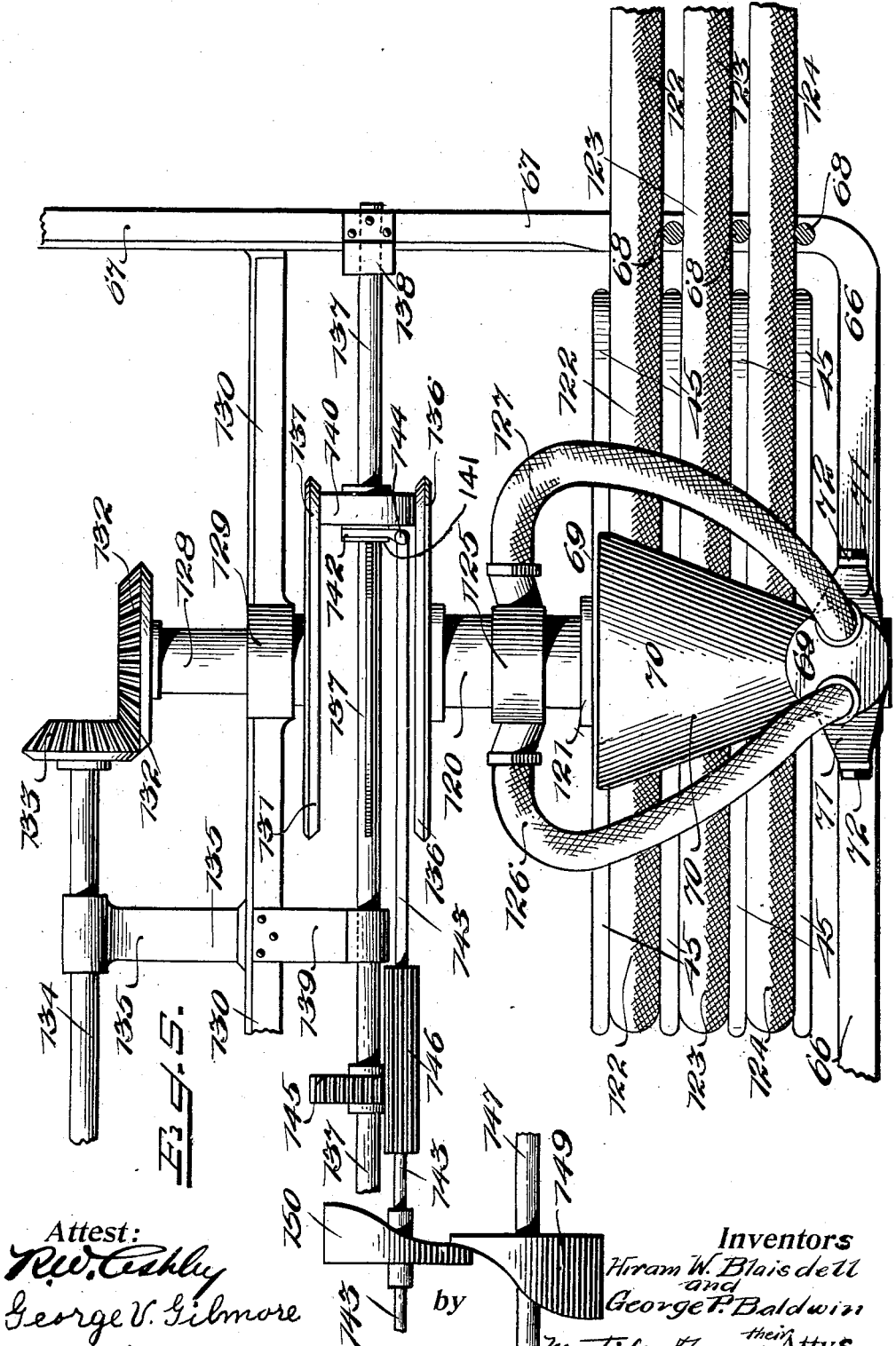

H. W. BLAISDELL & G. P. BALDWIN.
HOSE REEL.
APPLICATION FILED JULY 16, 1907.
923,320.
Patented June 1, 1909.
6 SHEETS—SHEET 6.
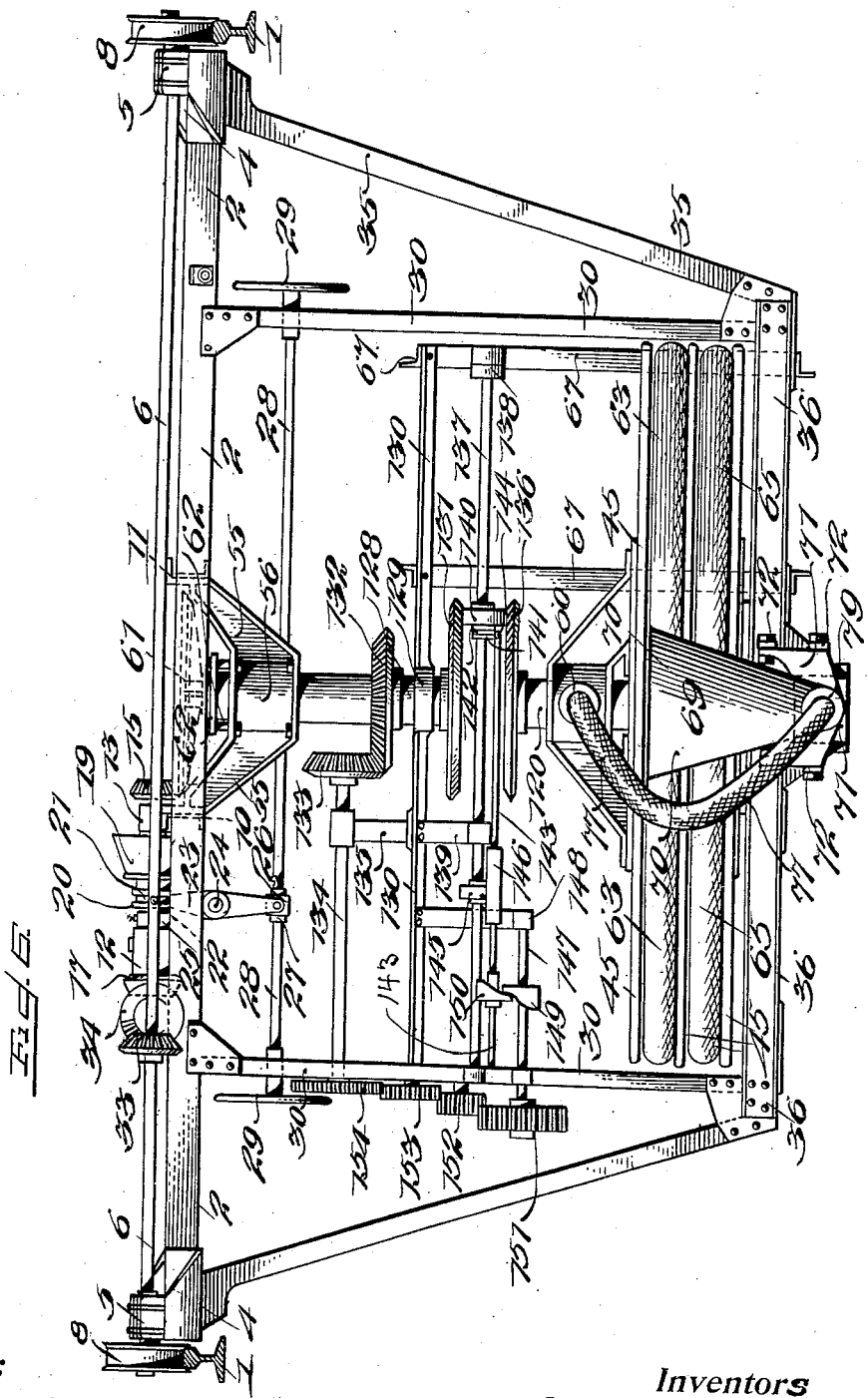
Attest:
R. W. Ashley
George V. Gilmore
Inventors
Hiram W. Blaisdell
and
George P. Baldwin
by Mastick & Jones their Attys

UNITED STATES PATENT OFFICE.

HIRAM W. BLAISDELL AND GEORGE P. BALDWIN, OF LOS ANGELES, CALIFORNIA.

HOSE-REEL.

No. 923,320.   Specification of Letters Patent.   Patented June 1, 1909.

Application filed July 16, 1907. Serial No. 384,065.

*To all whom it may concern:*

Be it known that we, HIRAM W. BLAISDELL and GEORGE P. BALDWIN, citizens of the United States, and residents, respectively, of Los Angeles, in the county of Los Angeles and State of California, have invented certain new and useful Improvements in Hose-Reels, of which the following is a specification.

Our invention relates to improvements in hose reels with particular reference to a device adapted to be used in connection with apparatus employed in water purifying and filtration plants. Such apparatus is designed to be employed for the purpose of cleaning or removing the bacteria laden sand of the filter and of returning cleaned sand to the filter and distributing the same over the bed thereof. Suitable flexible connections with such apparatus are desirable to convey the sand and a vehicle, such as water, from and to the filter, and our invention finds a particular application in connection with such use although it is in no wise restricted thereto.

We have described and illustrated our invention in connection with means for removing the sand and its vehicle from the filter, although it is as well applicable to carrying sand and its vehicle to the filter, as will be obvious.

In the following is described, in connection with the accompanying drawings, one embodiment of the invention, with modifications, the features thereof being more particularly pointed out hereinafter in the claims.

In the drawings Figure 1 is a plan view illustrating one form of the invention; Fig. 2 is a front elevation partly in longitudinal section of Fig. 1; Fig. 3 is a cross sectional view on the line A—B of Fig. 1; Fig. 4 illustrates a modified form of construction showing a winding drum or reel adapted to carry a series of supply and exhaust hose; Fig. 5 is a side elevation of one form of the winding drum and speed changing mechanism; Fig. 6 is a side elevation of a reel similar to that shown in Figs. 1, 2 and 3, having a speed changing mechanism applied thereto; Fig. 7 is an enlarged longitudinal sectional view of one form of clutch control mechanism, and Fig. 8 is an enlarged elevation of one form of sand ejector means.

Similar numerals of reference indicate similar parts throughout the several views.

The apparatus as illustrated is adapted to be supported from and moved along tracks or runways 1, 1, which are in turn supported by any suitable means, not shown. The main carriage comprises longitudinal frames 2, 2, and end frames 3, 3, held together at their points of intersection by means of web plates 4, 4, which latter may have upwardly turned portions 5, 5, adapted to form bearings for driving shafts 6 and 7, said shafts carrying at their outer ends wheels 8, 8, adapted to run on tracks 1, 1.

9, 10 and 11 are cross frames or bars suitably mounted on and bridging across the longitudinal frames 2, 2. Bearings 12 and 13 are mounted on bars 9 and 10 respectively, bearing 13 being adapted to receive one end of a shaft 14 carrying a beveled gear 15, the other end of shaft 14 finding a bearing in a sleeve 16 mounted in bearing 12 and carrying a beveled gear 17. Shaft 14 and sleeve 16 carry a clutch mechanism comprising a member 18 keyed on shaft 14 and a member 19 keyed on sleeve 16. The member 19 is provided with a collar 20 having a circumferential groove 21 formed therein adapted to receive pins 22, 22, on the upper ends of levers 23, 23, pivoted at 24 from bar 9. The collar 25 is provided to limit the motion of member 19 of the clutch mechanism. The lower ends of levers 23, 23, are pivotally connected to an internally screw-threaded collar 26, engaging a screw threaded portion 27 on a shaft 28 provided at each end with a hand wheel 29 and mounted in the frames or bars 30 depending from bars 2, 2, said bars 30 forming a portion of the reel supporting frame, as hereinafter described. Through the means described the clutch mechanism can be readily actuated from either side of the machine.

31 is a cross shaft turning in bearings on bars 2, 2, and carrying a beveled gear 32 at each end adapted to engage gears 33, 33, on driving shafts 6 and 7 respectively, and beveled gear 34 adapted to engage gear 17 on sleeve 16.

The reel supporting frame is suspended from the main carriage and comprises depending bars 30, 30, 35, 35, and cross bars 36. The reel as shown in Figs. 1, 2 and 3 comprises a shaft 37 hollowed above and below as at 38 and 39, said hollowed portions being separated from each other by a solid portion 40, as shown, and a drum 41 preferably cast integrally therewith and having a circumferential rim 42 provided with sockets 43 adapted to receive the inner ends of spokes 44 which latter carry rims 45 at their outer ends. Web plates 46 connecting the shaft 37 and the rim 42 serve as an additional support for the drum. Shaft 37 finds a bearing at its lower end in a casting 47 which comprises a hollow neck portion 48 communicating with port 49, said portion 48 being adapted to fit into hollow portion 39 in shaft 37, and an annular frame portion 50 supported on cross bars 36 and carrying a flange 51 on which the drum 41 is adapted to rest.

52 is a thin strip of material, such as steel, interposed between the face of drum 41 and flange 51, on which the reel rests as it turns with shaft 37. A stuffing box 53 is provided to insure water and air tight connection between port 49 and hollow neck portion 48.

Shaft 37 finds a bearing at its upper end in a casting 54 supported from the main carriage by means of flanges or webs 55, 55. Casting 54 comprises an annular portion 56 provided with an annular chamber 57 adapted to communicate with openings 58 in the hollow portion 38 of shaft 37, and a hollow projecting portion 59 adapted to form a port 60 for communication with chamber 57. Shaft 37 at its upper end carries a gear 61 adapted to engage gear 15 on shaft 14.

62, 62, are suitable stuffing boxes through which shaft 37 passes rendering the respective part thereof water and air tight.

63 is a supply hose adapted to be wound on the reel between the top and middle series of spokes 44 connecting at one end with a suitable water supply under pressure (not shown), and at the other end with a coupling 64 Fig. 1 communicating with hollow portion 38 of shaft 37. 65 is an exhaust hose adapted to be wound on the reel between the middle and lower series of spokes 44 connecting at one end with a coupling (not shown) communicating with hollow neck portion 48 of casting 47 and discharging at any suitable place at the other end.

66 is an auxiliary frame suitably fastened to the bottom of the reel supporting frame as on cross bars 36 and having an up-turned portion 67 carrying rollers 68 over which the hose 63 and 65 are adapted to pass as they are being wound or unwound.

69 is a sand ejector comprising a hopper 70 mounted on casting 71, said casting 71 being in turn pivotally mounted on the outer ends of bracket arms 72, 72, as at 73, the inner ends of said arms 72, 72, being also pivotally mounted as at 74 to supporting bracket 75, rigidly fastened to reel frame 36 by means of suitable bolts. Casting 71 contains a compartment or mixing chamber 76, communicating with water supply hose 77 and exhaust hose 78 and into which hopper 70 discharges. Supply hose 77 connects port 60 and ejector nozzle 79 mounted in casting 71 and extending slightly beyond the inner wall thereof into chamber 76. Exhaust hose 78 connects port 49 and tap connection 80 in casting 71 communicating with the other side of chamber 76 from ejector nozzle 79.

81 is a threaded adjusting rod pivotally mounted as at 82 on yoke 83 fastened to upper bracket arms 72, as at 84.

85 is a supporting arm or auxiliary frame piece fastened to one of the longitudinal beams 2, by any suitable means (not shown), and has at its outer end a threaded socket 86 adapted to receive threaded adjusting rod 81, the required adjustment being accomplished by means of adjusting head 87 which normally rests on and bears against auxiliary frame piece 85, the object of said adjustment being to raise or lower the sand ejector means to any desired working plane and at the same time maintain its parallel position.

Fig. 4 of the drawings illustrates a modification showing a double reel in which two supply hose and two discharge hose are adapted to coöperate with two sand ejector means, one of which may be arranged at each side of the apparatus, the reel being supported substantially as hereinabove described. The reel comprises a drum 92 and a shaft 88 preferably cast integrally therewith and hollowed above and below as at 89 and 90, said hollowed portions being separated from each other by a solid portion 91. Shaft 88 corresponds with shaft 37 as above described and the drum is provided with rims 42 preferably stepped as shown, having sockets 43 adapted to receive spokes 44 carrying rims 45 substantially as described above. Shaft 88 carries flanges or webs 93, 94, 95 and 96 for the purposes hereinafter described. Said shaft finds a bearing at its lower end in auxiliary frame 66 as at 97, and at its upper end in a casting 98, suitably supported from the main frame, and resting on flanges 93 on the shaft. Casting 98 is provided with a hollow projecting portion 99 to which sand ejector supply pipe 100 is adapted to be coupled. An annular chamber 101, in casting 98 and surrounding shaft 88, is adapted to communicate with hollow portion 89 through openings 102. Supply hose 103 is adapted to discharge into the lower end of hollow portion 89 as shown. The upper portion of drum 92 surrounding shaft 88 is hollowed out to form a chamber 104 communicating with supply hose 105. A casting 106, resting on flanges 94 and the walls of chamber 104 closes the top of the chamber and is provided with a hollow projecting portion 107 to which sand ejector supply pipe 108 is adapted to be coupled. Suitable stuffing boxes are provided for rendering the connections air and water tight. Hollow portion 90 of shaft 88 connects at one end with the discharge hose 109 and at the other with sand ejector exhaust pipe 110 coupled to projecting portion 111 of casting 112 resting on flanges 96, an annular chamber 113 being formed between the casting and the shaft communicating with hollow portion 90 of the shaft through openings 114. The bottom portion of drum 92 surrounding shaft 88 is also hollowed out to form a chamber 115 communicating with discharge hose 116. A casting 117 resting on flanges 95 and the walls of chamber 115 closes the bottom of the chamber and is provided with a hollow projecting portion 118 to which sand ejector exhaust 119 is adapted to be coupled. Suitable stuffing boxes may be provided to render the connections described air and water tight.

Fig. 5 illustrates a further modification, including a means of changing the speed at which the reel drum winds or unwinds the hose thereon. 120 is a shaft having mounted at its lower end a reel drum 121 adapted to carry two sets of supply hose 122 and 123 and a single exhaust hose 124. 125 is a port casing adapted to receive hose connections 126 and 127 comprising the means of communication between the water supply and the sand ejector means. 128 is an auxiliary shaft mounted in bearing 129 in supporting beam 130 fastened to upwardly extending portion 67 of the auxiliary frame 66 of the reel frame, said shaft 128 carrying a friction disk 131 at its lower end and a beveled gear 132 at its upper end, said gear 132 engaging driving gear 133 on auxiliary driving shaft 134 supported in bearing 135 on beam 130. Shaft 120 carries at its upper end a friction disk 136 corresponding to and in alinement with friction disk 131 on auxiliary shaft 128. 137 is a shaft finding bearings in upwardly extending portion 67 of the reel frame, as at 138, and bearing 139, depending from beam 130, and is adapted to have slidably mounted thereon a friction wheel 140. Friction wheel 140 has cast therewith a collar 141 having cut therein a groove adapted to receive ring band 142 to which a rod 143 is attached as at 144. 145 is a spur gear mounted on shaft 137 and adapted to engage elongated face gear 146 on rod 143. 147 is a shaft finding bearings at one end in bearing 148 depending from beam 130 and at the other end in supporting frame 30, said shaft 147 having mounted thereon a cam 149 engaging cam 150 on rod 143. A spur gear 151 on shaft 147 actuates idlers 152 and 153, idler 153 engaging spur gear 154 on auxiliary drive shaft 134.

Fig. 6 of the drawings illustrates, on a smaller scale, the speed changing means shown in Fig. 5 as applied to the device shown in Figs. 1, 2 and 3.

In operation the device is run along tracks or runways 1, 1, at any desired speed either attached to or separate from its coöperating cleansing or distributing machine. It is preferable that the device be connected with and drawn by its coöperating machine. It is obvious that the device will not be in condition to operate until the clutch control is actuated to engage, so that it may be run to any desired point and then by means of the clutch control placed in condition for operation. To accomplish this hand wheel 29, on either side of the machine, is actuated causing arms 23 to force member 19 into engagement with member 18 on shaft 14. Motion is then transmitted from wheels 8, 8, on shafts 6 and 7 to gears 33, 33, engaging gears 32, 32, on cross shaft 31, causing gear 34 to transmit motion through the clutch control mechanism on shaft 14 to gear 15, which latter actuates gear 61 on shaft 37.

Referring more particularly to the form of device shown in Figs. 1, 2 and 3, the supply hose 63 having been connected with a suitable supply main (not shown), conducts the water into hollow portion 38 in shaft 37, thence it passes out through openings 58, port 60 and hose connection 77 to the sand ejector 69, carrying the sand into exhaust hose 65, preferably connected up with an exhauster (not shown), and causing sand and water to be drawn from the sand ejector through exhaust hose 78 and port 49. Hose 65 may be adapted to discharge its load in any suitable place and manner. It is obvious that the hose mounted on the reel drum is wound or unwound while the supply and exhaust means are in actual operation. To regulate the speed of the winding and unwinding means, motion is transmitted through gear 61 on shaft 37 to gear 132 on shaft 128 causing gear 133 on shaft 134 to actuate gear 154 engaging idler 153 which latter engages idler 152 causing power to be transmitted to gear 151 on shaft 147 which in turn through cams 149 and 150 causes elongated face gear 146 to travel longitudinally at a predetermined rate across the face of gear 145 on shaft 137. The movement of said elongated face gear 146 across the face of gear 145 causes friction wheel 140 to travel across the faces of friction disks 131 and 136 toward the center of said friction disks, the forward and lateral movement of said friction wheel 140 across the faces of said friction disks changing the rate of speed at which the winding and unwinding means is driven.

It is not necessary to further describe the mode of operation of the various modifications disclosed as the same is obvious in connection with the drawings and the foregoing description.

It is obvious that the principles of the device disclosed are applicable in many ways; that the device is not restricted to use in connection with filtering plants, and that the details thereof may be widely varied without departing from the spirit of our invention.

What we claim and desire to secure by Letters Patent of the United States is:—

1. In a device of the character described a frame, a shaft mounted therein, a chamber in said shaft, a reel carried by said shaft, a hose on said reel adapted to communicate with said chamber and means carried by said frame to actuate said shaft to wind and unwind said reel.

2. In a device of the character described a frame, a shaft mounted therein, chambers in said shaft, a reel carried by said shaft, hose on said reel, one hose being adapted to communicate with one of said chambers and another hose with another of said chambers, a connection between said chambers and means carried by the frame to actuate said shaft to wind and unwind said reel.

3. In a device of the character described a frame, a shaft mounted therein, chambers in said shaft, a reel carried by said shaft, hose on said reel, one hose being adapted to communicate with one of said chambers and another hose with another of said chambers, a connection between said chambers, sand reception means in said connection and means carried by the frame to actuate said shaft to wind and unwind said reel.

4. In a device of the character described a frame, a shaft mounted therein, chambers in said shaft, a reel carried by said shaft, hose on said reel, one hose being adapted to communicate with one of said chambers and another hose with another of said chambers, a connection between said chambers, sand reception means in said connection, means for adjusting the position of said sand reception means, and means carried by the frame to actuate said shaft to wind and unwind said reel.

5. In a device of the character described a frame, a reel supported thereby, hose on said reel and an hydraulic ejector, one of said hose being connected to one side of said ejector and the other to the other side of the ejector.

6. In a device of the character described a frame, a reel supported thereby, hose on said reel, an hydraulic ejector so arranged with relation to said hose that one hose acts as a supply to the ejector and the other as an exhaust, and means actuated by the movement of the frame to wind and unwind the reel.

7. In a device of the character described a frame, a shaft mounted therein, chambers in said shaft, a reel carried by said shaft, chambers in said reel, a plurality of hose on said reel, connections between said hose and said chambers, connections between said chambers so that one chamber acts as a supply and another as an exhaust, sand reception means in said last named connections and means carried by the frame to wind and unwind the reel.

8. In a device of the character described, a frame, wheels thereon, a track for said wheels, a reel carried by said frame, hose on said reel, sand reception means in connection with said hose and means actuated by the movement of the wheels on the track to turn said reel to wind and unwind said hose.

In testimony whereof we have hereunto signed our names in the presence of two subscribing witnesses.

HIRAM W. BLAISDELL.
GEORGE P. BALDWIN.

Witnesses to the signature of Hiram W. Blaisdell:
WM. T. BARR,
W. J. PALETHORPE.

Witnesses to the signature of George P. Baldwin:
ROBERT W. ASHLEY,
M. E. McNINCH.